(12) United States Patent
    Svensson

(10) Patent No.: US 12,674,484 B2
(45) Date of Patent: Jul. 7, 2026

(54) STATIC LOAD COMPRESSION SPRING

(71) Applicant: Välinge Innovation AB, Viken (SE)

(72) Inventor: Johan Svensson, Kattarp (SE)

(73) Assignee: VÄLINGE INNOVATION AB, Viken (SE)

( * ) Notice: Subject to any disclaimer, the term of this patent is extended or adjusted under 35 U.S.C. 154(b) by 426 days.

(21) Appl. No.: 18/191,444

(22) Filed: Mar. 28, 2023

(65) Prior Publication Data

US 2023/0323910 A1 Oct. 12, 2023

(30) Foreign Application Priority Data

Mar. 31, 2022 (SE) .................................... 2250408-8

(51) Int. Cl.
   *F16B 12/24* (2006.01)
   *F16B 12/26* (2006.01)
   *F16B 21/12* (2006.01)

(52) U.S. Cl.
   CPC .............. *F16B 21/12* (2013.01); *F16B 12/24* (2013.01); *F16B 12/26* (2013.01); *A47B 2230/0037* (2013.01)

(58) Field of Classification Search
   CPC .......... F16B 12/20; F16B 12/24; F16B 12/26; Y10T 403/32483; A47B 2230/0037
   See application file for complete search history.

(56) References Cited

U.S. PATENT DOCUMENTS

| | | | | |
|---|---|---|---|---|
| 1,210,669 | A | * | 1/1917 | Soltesz .................... F16B 39/04 |
| | | | | 411/211 |
| 3,181,411 | A | | 5/1965 | Mejlso |
| 6,230,456 | B1 | * | 5/2001 | Merchlewitz ........... E06B 3/685 |
| | | | | 411/908 |
| 9,714,673 | B2 | * | 7/2017 | Phillips .................... F16B 12/26 |
| 11,542,977 | B2 | * | 1/2023 | Baus ...................... F16B 19/109 |
| 2020/0069048 | A1 | | 3/2020 | Derelöv et al. |
| 2020/0340513 | A1 | * | 10/2020 | Derelöv .................. F16B 12/26 |

FOREIGN PATENT DOCUMENTS

| | | | | |
|---|---|---|---|---|
| CA | 3 098 285 | * | 10/2019 | ................ F16F 1/02 |
| DE | 9114810 U1 | | 2/1992 | |
| DE | 29922524 U1 | | 5/2001 | |

(Continued)

OTHER PUBLICATIONS

International Search Report and Written Opinion received for PCT Patent Application No. PCT/SE2023/050278, mailed on May 26, 2023, 14 pages.

(Continued)

*Primary Examiner* — Michael P Ferguson
(74) *Attorney, Agent, or Firm* — Boone IP Law

(57) ABSTRACT

A locking device including a spring, such as a static load spring, and a locking part, such as a locking pin or a locking disc, for locking two elements to one another includes connecting elements and U-shaped portions in a sequence. The U-shaped portions connect two connecting elements at a first end of said two connecting elements, respectively, wherein the two connecting elements converges towards each other towards a second end of the two connecting elements, respectively, in a non-compressed state, such that the sequence of connecting elements and U-shaped portions form a meandering shape.

21 Claims, 12 Drawing Sheets

(56)　　　　　　References Cited

FOREIGN PATENT DOCUMENTS

| | | | |
|---|---|---|---|
| FR | 1090004 A | 3/1955 | |
| GB | 2494462 A | 3/2013 | |
| WO | WO 2020/046193 * | 3/2020 | ............. F16B 12/24 |
| WO | 2023181087 A1 | 9/2023 | |

OTHER PUBLICATIONS

Office Action received for Swedish Patent Application No. 2250408. 8, mailed on Dec. 15, 2022, 8 pages.
Extended European Search Report issued by the European Patent Office (EPO) in Application No. 23781489.2 dated Feb. 17, 2026, 8 pages.

* cited by examiner

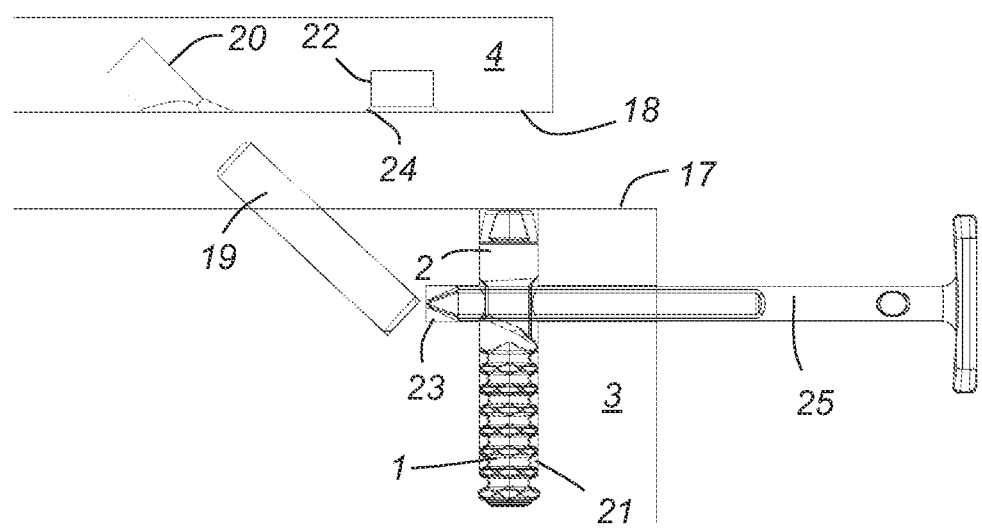
FIG 14
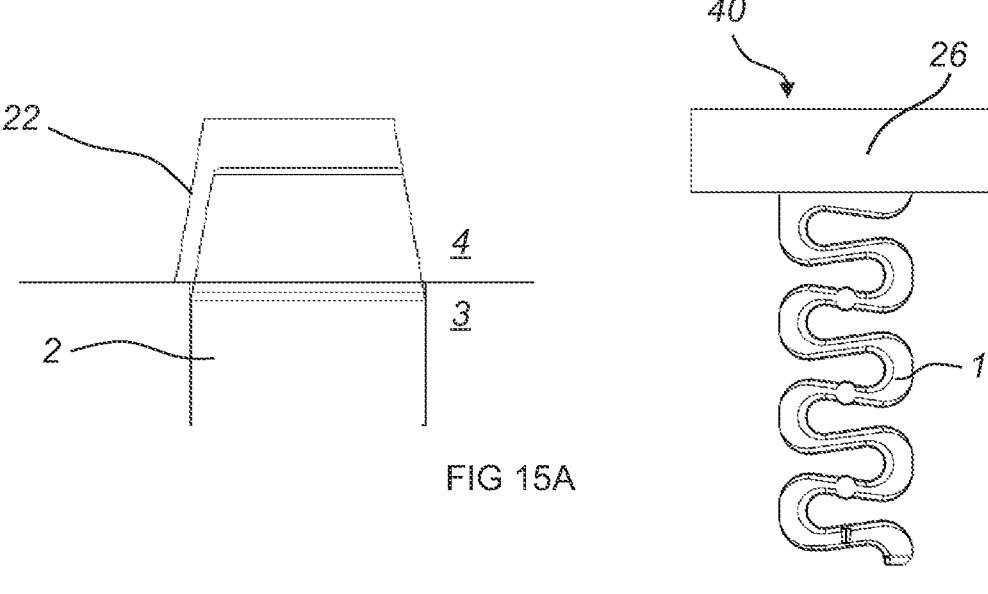
FIG 15A
FIG 15B
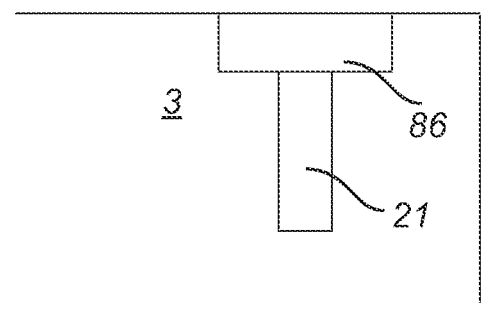
FIG 15C
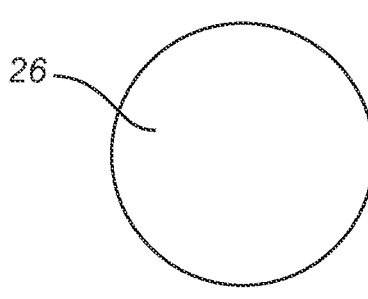
FIG 15D

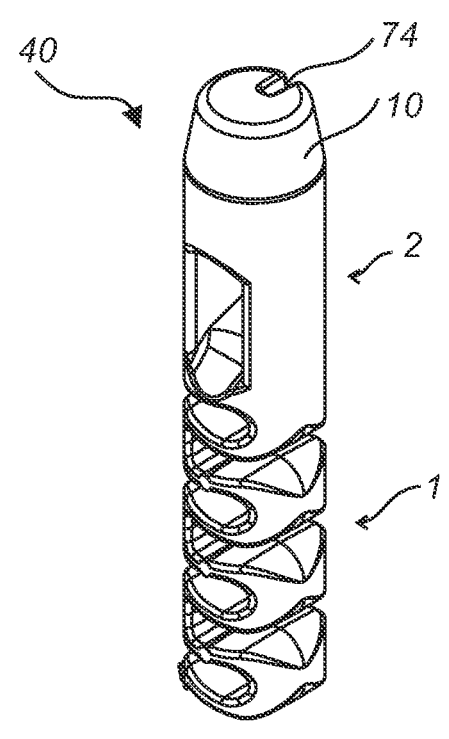
FIG 20A
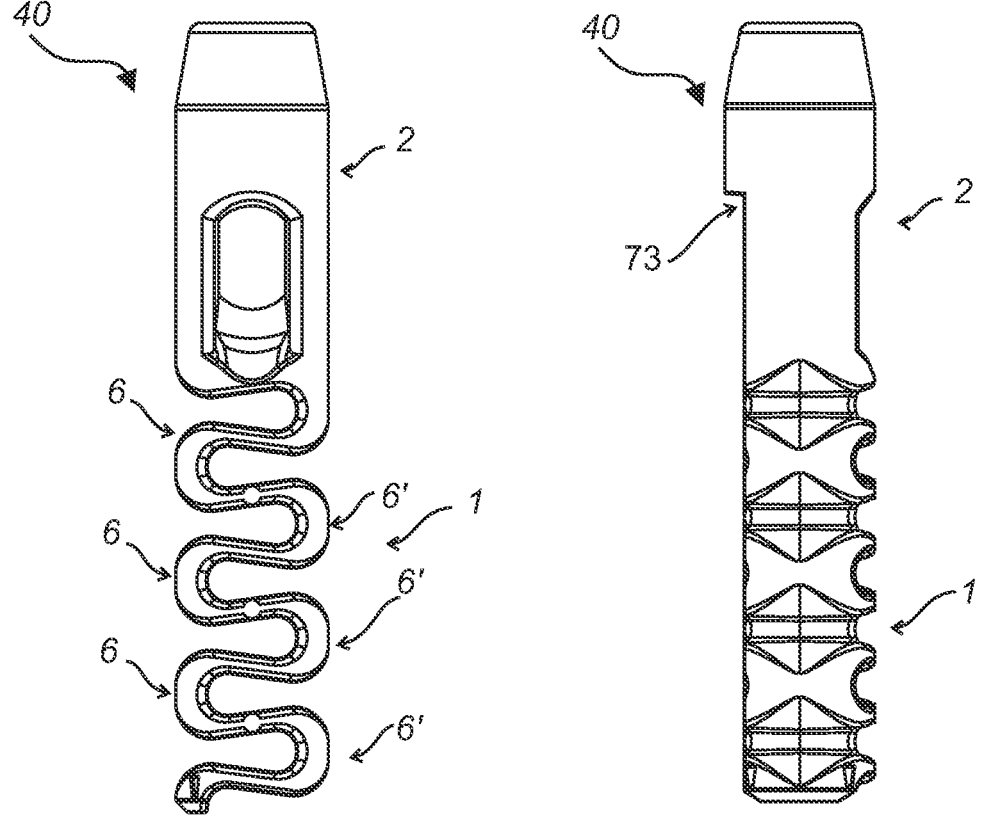
FIG 20B
FIG 20C

STATIC LOAD COMPRESSION SPRING

CROSS REFERENCE TO RELATED APPLICATIONS

The present application claims the benefit of Swedish Application No. 2250408-8, filed on Mar. 28, 2022. The entire contents of Swedish Application No. 2250408-8 are hereby incorporated herein by reference in their entirety.

TECHNICAL FIELD

The present disclosure invention relates to a locking device comprising a spring, such as a static load spring, and a locking part, such as a locking pin or a locking disc, for locking two elements to one another.

BACKGROUND

Assembling two or more objects into one piece, for instance furniture, has historically required tools such as drills, screwdrivers, hammers, and wrenches.

Starting with click floors, assembling not requiring tools has further been developed and more or less all types of furniture in a household could be assembled without tools or at least with a minimum of tools.

When locking two panels to one another a locking device is known comprising a spring at one end and a locking part at the other end. The spring end of the locking device is inserted into a recess of one of the panels, leaving the locking pin protruding above the surface of the panel. The other panel has a corresponding recess for receiving the locking pin when the two panels are brought together.

SUMMARY

According to the present disclosure, an alternative spring is provided according to the appended claims. The spring could be used in various situations; however, the present spring is preferably used as the spring of a locking pin, but other uses are not excluded.

A first aspect of the present disclosure comprises a locking device comprising a spring, such as a static load spring, and a locking part, such as a locking pin or a locking disc, configured for locking two elements to one another.

The spring may comprise a U-shaped portion and an adjacent U-shaped portion, wherein a leg of the U-shaped portion may be connected to a leg of the adjacent U-shaped portion.

The spring may comprise a connecting element which connects the leg of the U-shaped portion to the leg of the adjacent U-shaped portion.

A crosscut at a bottom of the U-shaped portions may be non-circular.

A crosscut at a bottom of the adjacent U-shaped portions may be non-circular.

A crosscut at a bottom of the U-shaped portions may comprise an outer surface which is of a rounded shape and an opposite inner surface which is essentially straight.

A crosscut at a bottom of the adjacent U-shaped portions may comprise an outer surface which is of a rounded shape and an opposite inner surface which is essentially straight.

The spring may comprise connecting elements and U-shaped portions in a sequence. The U-shaped portions connect two connecting elements at a first end of said two connecting elements, respectively, wherein the two connecting elements converges towards each other towards a second end of the two connecting elements, respectively, in a non-compressed state, such that the sequence of connecting elements and U-shaped portions form a meandering shape.

A further advantage with the spring may be that the spring may be relatively short, compared to known springs, and still allow for a considerable compression, i.e., the compressibility vs length is relatively high. A length of the spring may be in the range of about 10-40 mm, such as 20-30 mm.

A further advantage with the spring may be that an outer diameter of the spring does not increase, or that an increase of the outer diameter is insignificant, such as less than 0.3 mm, when the spring is compressed. This may have the effect that the spring when inserted in e.g., a hole or recess is not pinched in the hole/recess when the spring is compressed.

According to an aspect of the present disclosure, the spring is configured such that two adjacent U-shaped portions are closer to or contact each other in a compressed state compared to the non-compressed state.

According to an aspect of the present disclosure, the spring is configured such that in a compressed state, two adjacent connecting elements are closer to or contact each other at their respective second ends compared to the non-compressed state.

According to a further aspect of the present disclosure, the U-shaped portions are circle segments extending over more than 180°.

According to another aspect of the present disclosure, the length of the connecting elements is smaller than the width of the connecting elements at their centre portion.

According to yet another aspect of the present disclosure, one end of the spring ends in the U-shaped portion such that the end points in a direction away from the spring, such as a longitudinal extension of the spring. This design provides for a more robust contact with the end of recess in which the spring sits since, in an embodiment, both the half-finished U-shaped portion and the last entire U-shaped portion contacts the bottom of the recess, such as when the bottom of the recess is flat.

According to a further aspect of the present disclosure, a thickness of the connecting elements is smaller than a thickness of the U-shaped portion.

The thickness of the connecting element may be in the range of 10% to 90%, such as 20 to 80%, such as 30% to 70%, such as about 50% of the thickness of the U-shaped portions.

The shape along the spring, according to one aspect of the present disclosure, is such that a surface circumventing the outer parts of the connecting elements and the U-shaped portions is cylindrical. The spring will thus not bend away from its axis when compressed and placed in cylindrically shaped recess.

According to an aspect of the present disclosure, the diameter of the cylindrical surface at non-compressed state is greater than at maximum compression of the spring. Due to the meander shape of the spring, when compressed, the diameter will remain the same or even decrease, depending on the level of meandering.

According to a further aspect of the present disclosure, one end of the locking device comprises the locking pin.

According to yet another aspect of the present disclosure, the locking pin has an end part in the shape of a truncated cone.

According to a further aspect of the present disclosure, the locking pin has a radial recess through the locking pin.

According to an aspect of the present disclosure, the opening of the radial recess is larger on one side of the locking pin such that there is an inner sloping surface towards the other opening.

According to a further aspect of the present disclosure, an end part of the locking pin has a cut-out segment.

According to yet a further aspect of the present disclosure, the centre portion of the connecting element farthest from the locking pin, has two opposed radially projecting parts on its outermost surface.

According to yet another aspect of the present disclosure, the spring is injection moulded. Thus, the entire spring is made from the same material.

According to yet another aspect of the present disclosure, the locking device comprises a polymer material, such as a thermoplastic material, optionally with an enforcement, such as glass fibre.

According to yet another aspect of the present disclosure, the spring and the locking part may be injection moulded in one piece.

According to yet another aspect of the present disclosure, the elements are panels, such as wood based panels.

According to yet another aspect of the present disclosure, the wood based panels are HDF, MDF or plywood panels.

According to yet another aspect of the present disclosure, the elements may be furniture components, which may be a part of a furniture product, such as a bookshelf, a cupboard, a wardrobe, a box, a drawer, a kitchen cabinet, a countertop, or a tabletop.

A second aspect of the present disclosure comprises a locking device comprising a spring and a locking part, such as a locking pin or a locking disc, for locking two elements to one another. The spring comprises a U-shaped portion and an adjacent U-shaped portion. A leg of the U-shaped portion is connected to a leg of the adjacent U-shaped portion.

According to a further aspect of the present disclosure, the spring comprises a connecting element which connects the leg of the U-shaped portion to the leg of the adjacent U-shaped portion.

According to a further aspect of the present disclosure the leg of the U-shaped portion converges towards the other leg of the U-shaped portion.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIGS. 11 to 14 show in sequence the unlocking of the connection arrangement according to the present disclosure, FIG. 15A is a side view of an alternative embodiment of a part of the arrangement, FIG. 15B is a side view of a locking device with a locking disc according to the present disclosure, FIG. 15C shows an embodiment of the first panel, FIG. 15D shows a top view of the embodiment shown in FIG. 15B.

DETAILED DESCRIPTION OF EXAMPLE EMBODIMENTS OF THE INVENTION

Figures 1A, 1B, 1C, 1D:
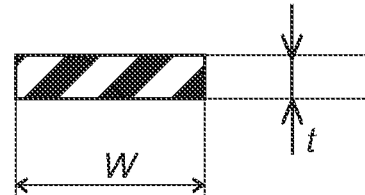
FIGS. 1A-1D are various views of a locking device of an embodiment according to the present disclosure.

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

With reference to FIGS. 1A-1C, 2, and 3, a locking device 40 is shown which comprises a spring 1 and a locking part, such as a locking pin 2. The locking device 40 can be used for locking two elements to one another.

As can be seen in the FIGURES, the spring 1 may comprise connecting elements 5 and U-shaped portions 6 in a sequence.

One of the U-shaped portions 6 may connect two of the connecting elements 5 at a first end 7a, 7b of each said two connecting elements 5, wherein the two connecting elements 5 may converge towards each other towards a second end 8a, 8b of each of the two connecting elements 5, in a non-compressed state, such that the sequence of connecting elements 5 and U-shaped portions 6 may form a meandering shape.

Two connecting elements 5 may converge at an angle 82 in the range of about 10°-30°, such as 15°-20°.

A centre line 81 of the spring may extend through a centre of each the connecting elements 5.

FIG. 1D shows a crosscut of an embodiment of the connecting elements 5.

The spring 1 may comprise a U-shaped portion 6 and an adjacent U-shaped portion 6'. A leg of the U-shaped portion may be connected to a leg of the adjacent U-shaped portion.

The spring 1 may comprise a connecting element 5 which connects the leg of the U-shaped portion 6 to the leg of the adjacent U-shaped portion 6. The leg of the U-shaped portion may converge towards the other leg of the U-shaped portion.

The spring 1 may comprise two or more U-shaped portions 6, 6'.

An advantage with this embodiment of the spring 1 may be that an outer diameter of the spring does not increase, or that an increase of the outer diameter is insignificant, such as less than 0.3 mm, when the spring 1 is compressed. This may have the effect that the spring 1 when inserted in e.g., a hole or recess 21 is not pinched in the hole/recess when the spring is compressed.

The locking device 40 may comprise a polymer material, such as a thermoplastic material, optionally with an enforcement, such as glass fibre.

The spring 1 and the locking pin 2 may be injection moulded in one piece.

The spring 1 may be configured such that in a compressed state, two adjacent connecting elements 5 are closer to or contact each other at their respective second ends 8a, 8b compared to the non-compressed state.

The U-shaped portions 6 may be circle segments extending over more than 180°, such as 180° to 270°, such as 190° to 240°.

As further can be seen, a length L of the connecting elements 5 may be smaller than a width W of the connecting elements 5 at their centre portion. The length L may be measured from an end of an inner curved surface 84 of the U-shaped portion 6 positioned closet to the centre line 81 to an end of an inner curved surface 85 of the adjacent U-shaped portion 6 positioned closet to the centre line 81.

The connecting element 5 may be a straight element, such as comprising an upper surface and a lower parallel surface.

A thickness t of the connecting elements 5 may smaller than a thickness T of the U-shaped portion 6. The thickness t of the connecting element 5 may be in the range of 10% to 90%, such as 20 to 80%, such as 30% to 70%, such as about 50% of the thickness T of the U-shaped portions 6.

The thickness t of the connecting element 5 may be measured the centre line 81.

The thickness T of the U-shaped portion 6 may be measured through a bottom surface 64 of the U-shaped portion 6.

One end of the spring 1 ends in the U-shaped portion such that the end 9 points in a direction away from the spring 1, such as a longitudinal extension of the spring.

The shape along the spring is such that a surface circumventing the outer parts of the connecting elements 5 and the U-shaped portions 6 is cylindrical. The diameter of the cylindrical surface at non-compressed state is greater than at maximum compression of the static load compression spring 1.

Further, one end of the locking device 1 comprises the locking pin 2. The locking pin 2 may comprise an end part 10 in the shape of a truncated cone.

The locking pin 2 may comprise a radial recess 11 which may optionally extend through the locking pin 2. The opening of the radial recess 11 is larger on one side of the locking pin 2 such that there is inner sloping surface 12 towards the other opening.

For facilitating the placement of the spring-loaded pin, i.e., to be able to more easily check if the pin is placed correctly, the end part 10 of the locking pin 2 has a cut-out segment 15. Also, the centre portion of the connecting element 5 farthest from the locking pin 2, has two opposed radially projecting parts 14 on its outermost surface. When the spring-loaded locking pin is inserted in a hole/recess in a panel, the locking pin with these projecting parts 14 exhibit a rotational resistance.

The lateral surface of the locking pin has a radially extending recess 11, the recess 11 having an inner sloping surface 12 axially towards the locking pin and starting at an axial point 13 at the side of the recess opening closest to the end with the spring of the locking pin. The sloping surface angle & is in the range of 15° to 45°, such as 20° to 40°, such as about 30°, as seen from the side of the spring-loaded locking pin.

Figures 2, 3:
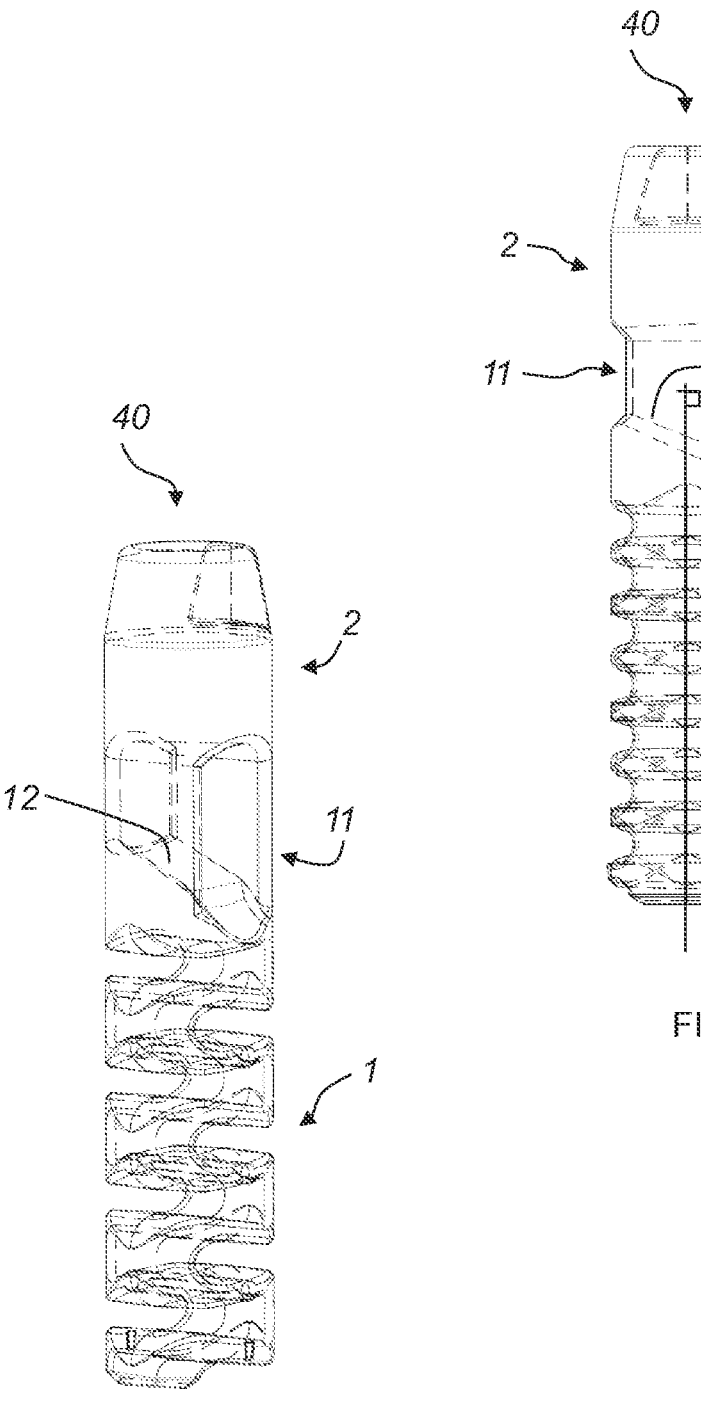
FIG. 2 is a sideview of the locking device of FIGS. 1A-1C.
FIG. 3 is a cross sectional perspective view of the locking device of FIGS. 1A-1C and 2, FIGS. 4 to 9 show in sequence the attaching of one panel to another panel with locking device according to the present disclosure.
Figure 4:
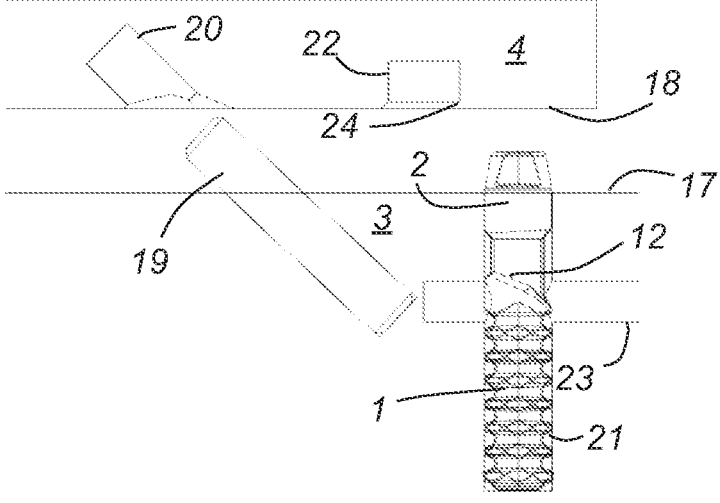

In FIG. 3, it is shown more clearly that the recess 11 is a through hole such that there is a recess opening and a recess exit.

As an example on how the spring can be used reference is now made to FIGS. 4 to 15.

FIGS. 4-9 show the process of connecting two panels to one another. Thus, there is a first panel 3, a second panel 4 wherein a surface 17 of the first panel 3 and a surface 18 of the second panel 4 are parallel and in contact in a locked position of the first and second panels 3, 4. The connection arrangement comprises at least one rod-shaped element 19 at said surface 17 of the first panel 3 and at least one corresponding insertion recess 20 at said surface 18 of the second panel 4.

The first panel 3 and/or the second panel 4 may be a wood based panel.

The wood based panel may be an HDF, a MDF or a plywood panel.

The first panel 3 and/or the second panel 4 may be furniture components which may be a part of a furniture product, such as a bookshelf, a cupboard, a wardrobe, a box, a drawer, a kitchen cabinet, a countertop, or a tabletop.

The rod-shaped element 19 is configured to be inserted in the insertion recess 20. The rod-shaped element 19 extends at a first angle from the surface 17 of the first panel 3 and the insertion recess 20 extends into the second panel 4 at a second angle from the surface 18 of the second panel 4. Both the first and second angles are 30° to 60°, such as about 45°. The connection arrangement comprises a spring-loaded locking pin 2 having a spring 1 at one end and a pin-shaped other end 2.

The locking pin 2 is arranged in a first panel recess 21 in one of the panels 3, 4 in a range from 85° to 95° relative said contact surface between the two panels 3, 4 and arranged with the locking pin 2 to fit in a second panel recess 22 in the other panel 3, 4 when the arrangement is in a connected state. The locking pin of the locking pin 2 is a truncated cone and the end surface of the locking pin being the top-surface of the truncated cone.

The first panel recess 21 and/or the second panel recess 22 may be a cylindrical hole, such as a drill hole.

Figure 5:
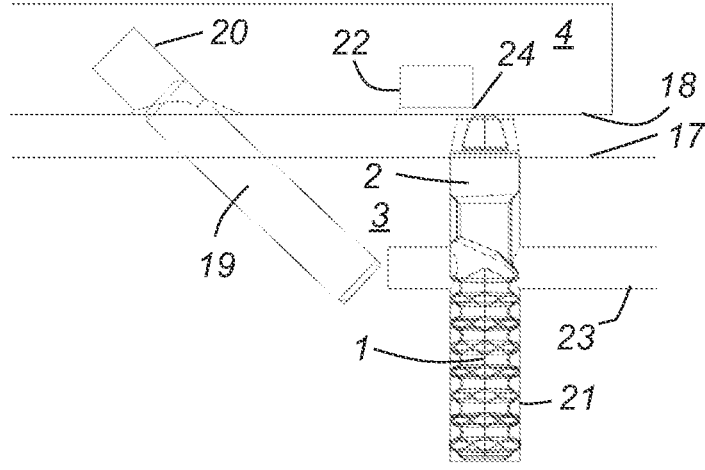

In one embodiment of the connecting arrangement the panels 3, 4 are brought closer together such that the rod-shaped element and the corresponding recess in the other panel are aligned. At one point, as shown in FIG. 5, the second panel 4 is in contact with the top of the spring-loaded locking pin 2.

Figure 6:
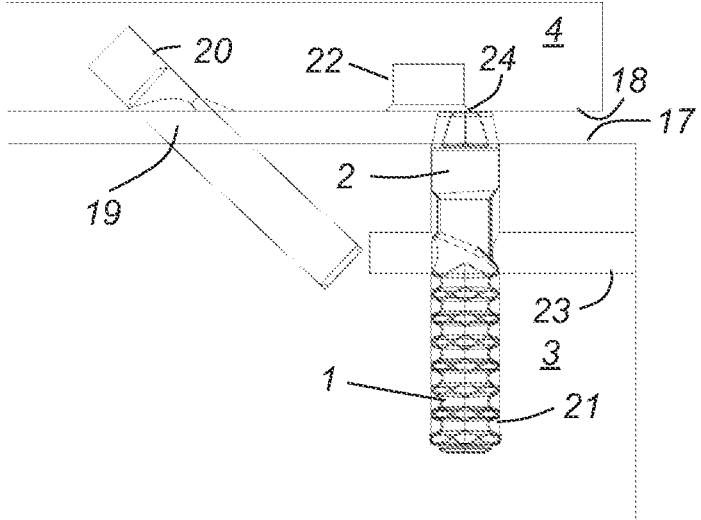
Figure 7:
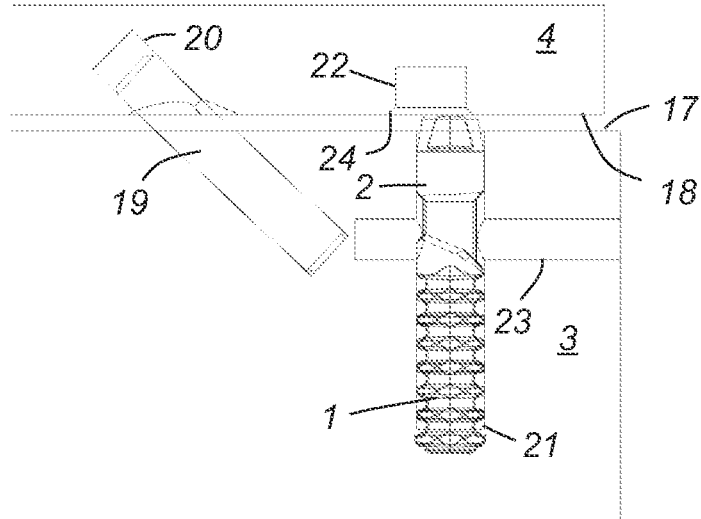
Figure 8:
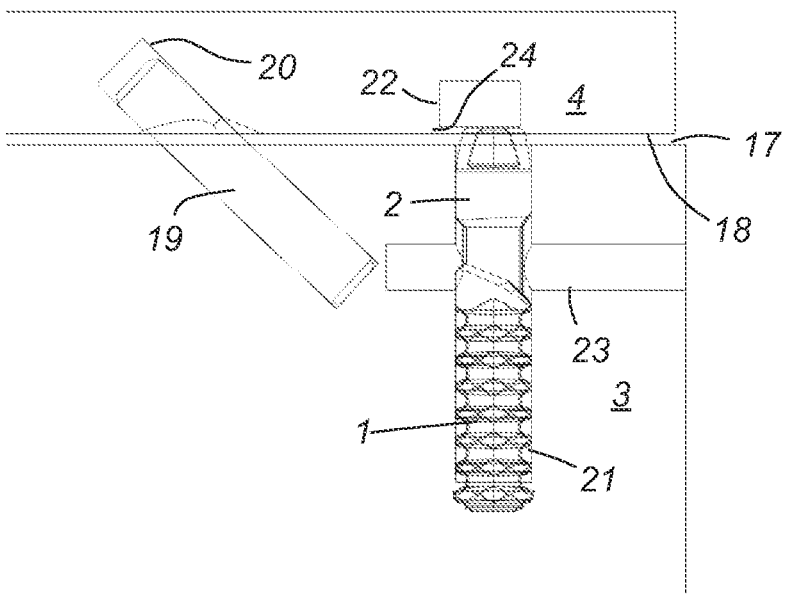

As shown in FIG. 6 the panels 3, 4 are closer and the spring 1 is slightly compressed and in FIGS. 7 and 8 the end 2 of the locking pin is coming closer to be aligned with the second panel recess 22, and the spring is more compressed.

Figure 9:
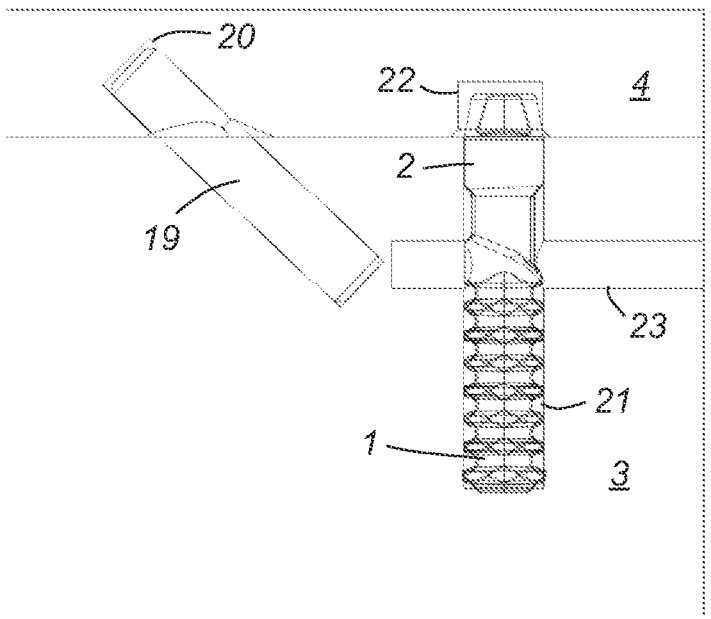

Finally in FIG. 9, the spring-loaded locking pin 2 has sprung back towards a non-compressed state and snapped into the second panel recess 22 and the two panels 3, 4 are connected to one another.

Figure 10:
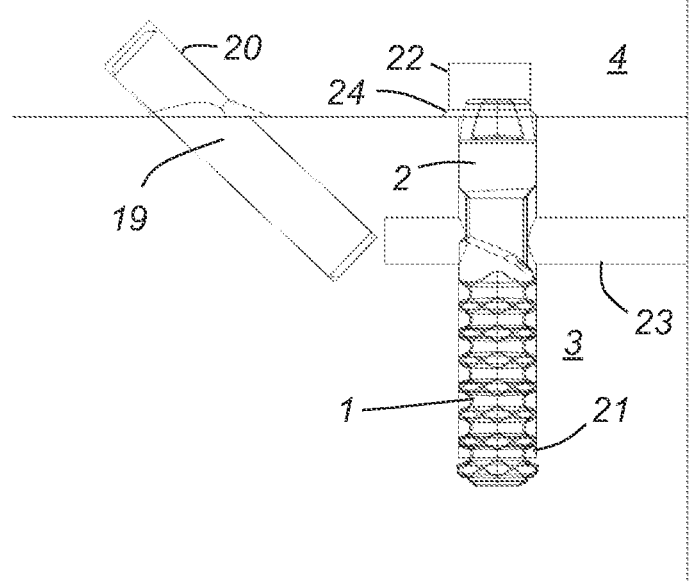
FIG. 10 is a side view of a connection arrangement according to an embodiment of the present disclosure.
Figure 11:
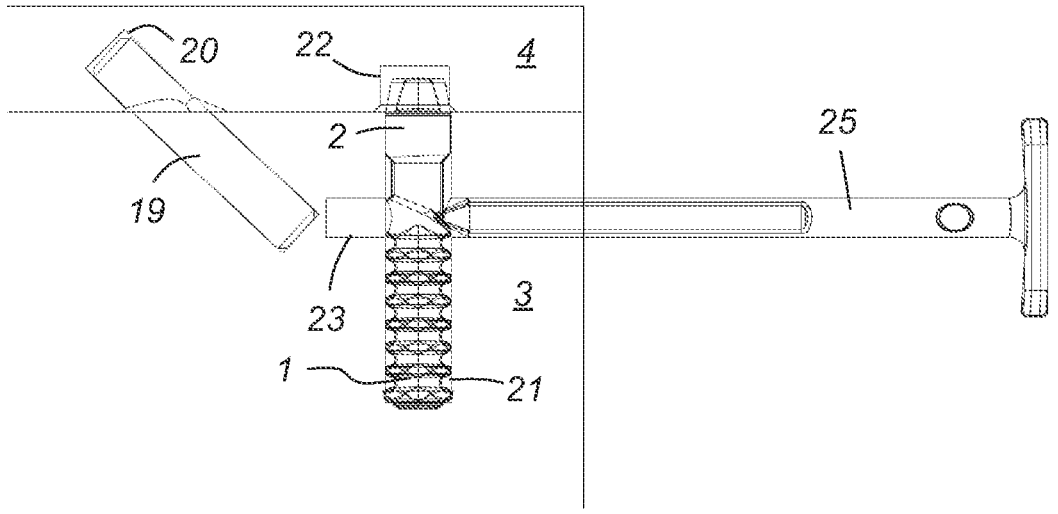

In FIG. 10, the advantage of the truncated cone at the end of the spring-loaded locking pin 2 is evident, i.e., as can be seen the spring-loaded locking pin 2 and the second panel recess 22 is not completely aligned. Even though not completely aligned, due to the truncated cone of the pin 2, the two panels 3, 4 are locked to one another. To further facilitate the connection, the second panel recess 22 has a beveled opening edge 24 along its circumference.

The slant angle of the truncated cone is in the range of 5° to 15°, such as about 8°-12°, such as about 10°, in the shown embodiment and the truncated cone is right. The centre axis of the locking pin is perpendicular to the contact surface between the panels 3, 4.

The lateral surface of the locking pin has a radially extending recess 11, the recess having an inner sloping surface 12 axially towards the locking pin 2 and starting at an axial point 13 at the side of the recess opening closest to the end with the spring 1 of the locking pin, see FIGS. 1-3.

The recess 11 in the locking pin is a through hole such that there is a recess opening and a recess exit.

The panel 3 with the first panel recess 21 has a service recess 23 in a direction perpendicular to the first panel recess 21 and arranged such that the two recesses 21, 23 connect at a distance below said contact surface of the panel 3. The service recess 23 further extends beyond the first panel recess 21 such that the two recesses 21, 23 cross.

Figure 12:
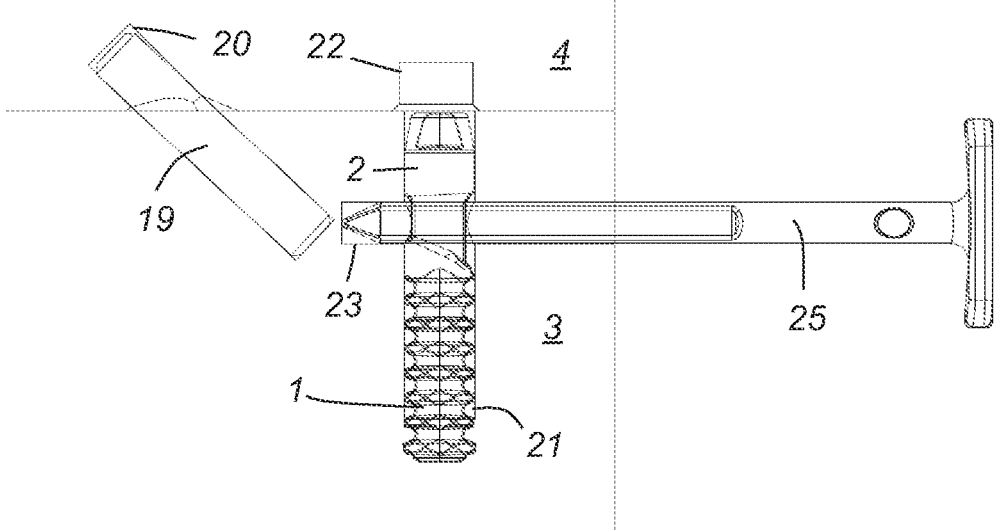
Figure 13:
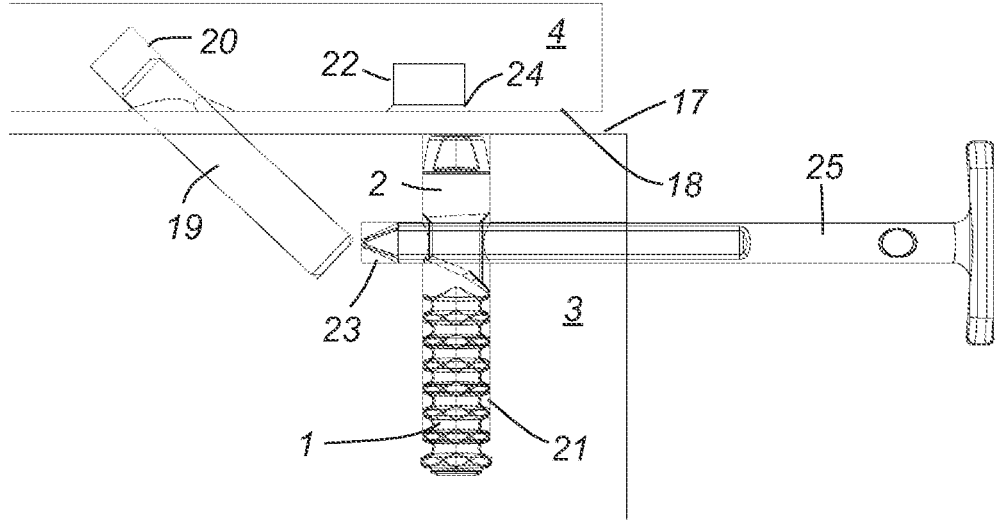

In FIGS. 11 to 14, the unlocking or disassembling of the connection arrangement is shown. A tool 25 is inserted in the service recess 23. The tool has similar angle on its tip to E on the sloping surface 12 of the recess through the locking pin 2. The further the tool 25 is pushed into the service recess 23, the more the spring is compressed until the tool 25 is pushed entirely through the recess as shown in FIGS. 12 to 14 when the panels 3, 4 can be pulled apart. Since the service recess 23 passes the panel recess 21, the tool 25 does not need to be held, i.e., the tool 25 stays in this position.

FIG. 15A shows an alternative embodiment of the recess 22, the recess 22 here having a conical shape corresponding to the truncated cone of the locking pin 2. Thus, the contact surface is increased between the locking pin 2 and the recess 22.

In FIG. 15B an alternative locking device 40 is shown in a side view and FIG. 15D shows the embodiment in a top view. The spring corresponds to the previously shown, however, instead of a locking pin, a disc shaped part 26 is used to increase the contact surface between the locking device 40 and the element that is to be locked together with the element in which the locking device 40 is arranged.

FIG. 15C shows that apart from the recess needed to accommodate the spring 1, an embodiment of the first panel may comprise a further recess 86, corresponding to the shape of the disc 26, such that the spring may be sufficiently compressed.

Figure 16:
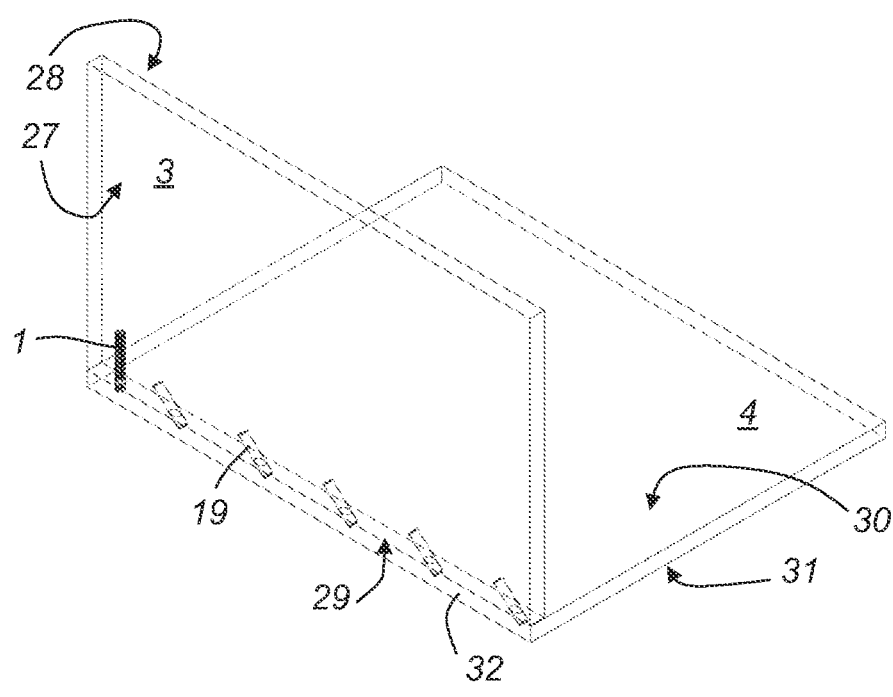
FIG. 16 is a perspective view of two panels joined perpendicular to one another with a connection arrangement.

For context purpose, FIG. 16 shows an example of two panels 3, 4 which are connected perpendicular to each other by the above-mentioned arrangement. The first panel 3 may comprise a main surface 27, a parallel and opposite main surface 28 and an edge surface 29 extending between the main surface 27 and the opposite main surface 28.

The second panel 4 may comprise a main surface 30, a parallel and opposite main surface 31 and an edge surface 32 extending between the main surface 30 and the opposite main surface 31.

The main surface 27 of the first panel 3 and the main surface 30 of the second panel 4 may be perpendicular to each other in the locked position of the first panel 3 and the second panel 4.

The edge surface 29 of the first panel 3 and a main surface 30 of the second panel 4 may be parallel and in contact in the locked position of the first and second panels 3, 4.

The edge surface 32 of the second panel 4 may be parallel in the locked position with the main surface 27 of the first panel 3.

Figure 17:
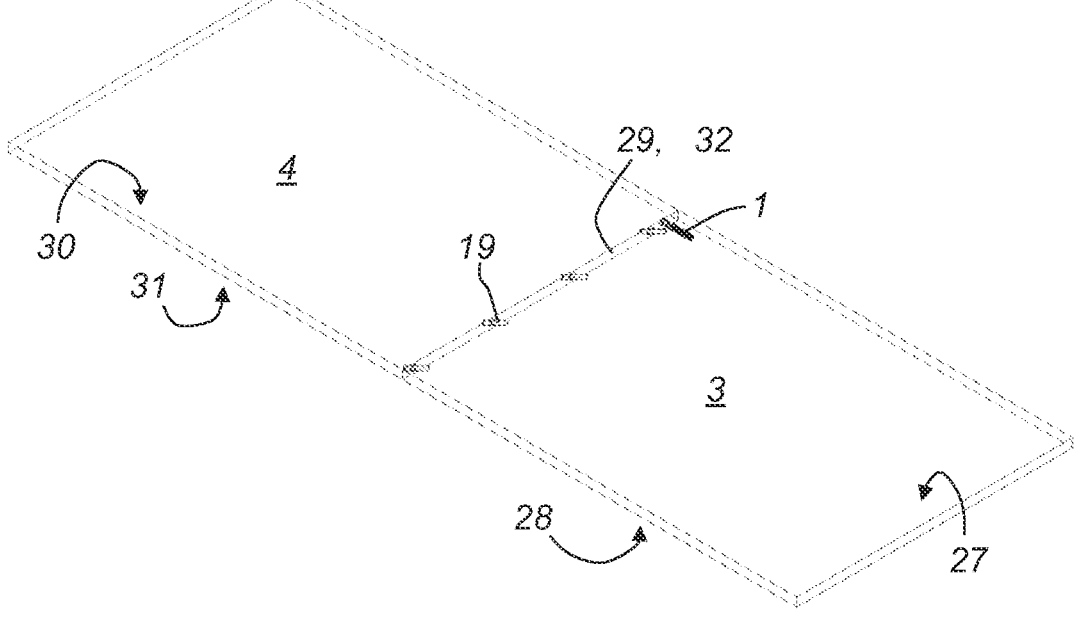
FIG. 17 is a perspective view of two panels joined with a connection arrangement, FIG. 18 schematically shows the spring in a compressed state according to the present disclosure.

FIG. 17 shows an example of two panels 3, 4 connected to establish a single panel with the area of the two individual panels 3, 4 using the above-mentioned connection arrangement.

The first panel 3 may comprise a main surface 27, a parallel and opposite main surface 28 and an edge surface 29 extending between the main surface 27 and the opposite main surface 28.

The second panel 4 may comprise a main surface 30, a parallel and opposite main surface 31 and an edge surface 32 extending between the main surface 30 and the opposite main surface 31.

The main surface 27 of the first panel 3 and the main surface 30 of the second panel 4 may be parallel to each other in the locked position of the first panel 3 and the second panel 4.

The edge surface 29 of the first panel 3 and the edge surface 32 of the second panel 4 may be parallel and in contact in the locked position of the first and second panels 3, 4.

The recesses 20, 21, 22, 23 in the panels 3, 4 are machine processed.

Further, as best shown in FIGS. 1-3, the spring-loaded locking pin 2 has two opposed radially projecting parts 14 at the end of the spring farthest away from the locking pin 2 for minimizing the risk of the locking pin 2 turning such that a tool 25 cannot be inserted in the panel recess 11.

Figure 18:
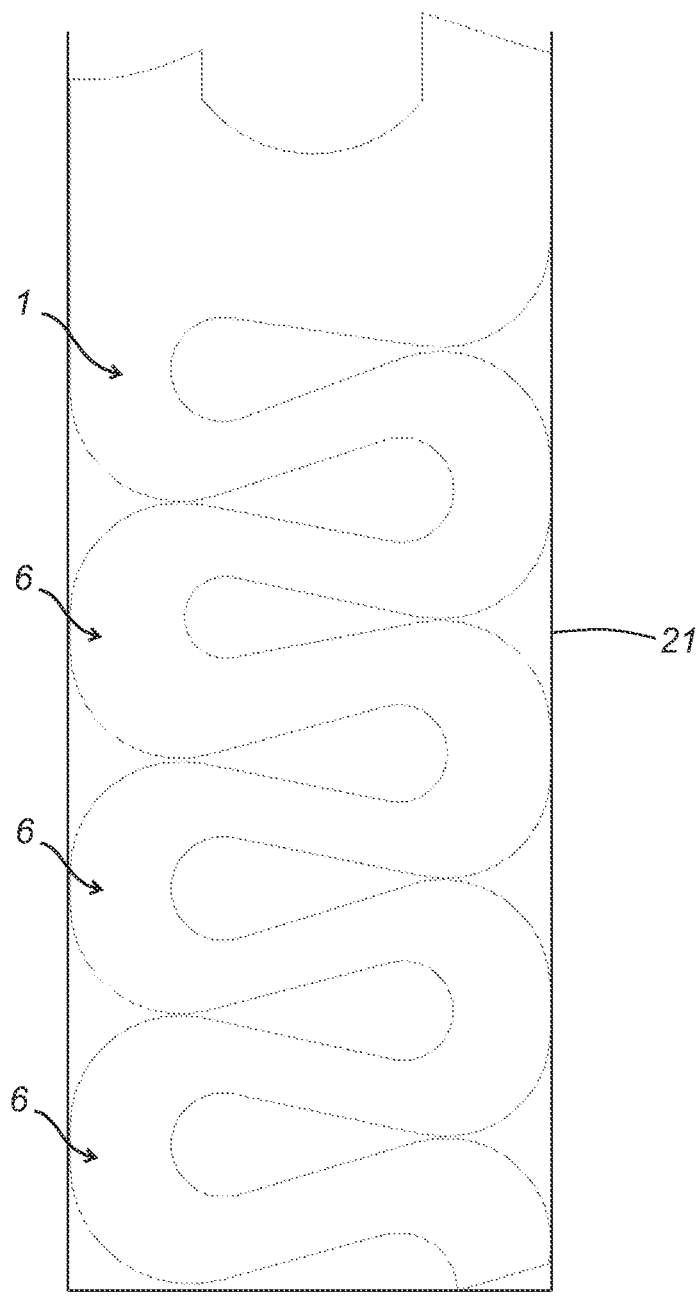

FIG. 18 shows the spring 1 in a compressed state in the recess 21. As can be seen, the spring 1 is configured such that two adjacent U-shaped portions 6 are closer to or contact each other in a compressed state compared to the non-compressed state shown in the other figures.

Figures 19A, 19B, 19C:
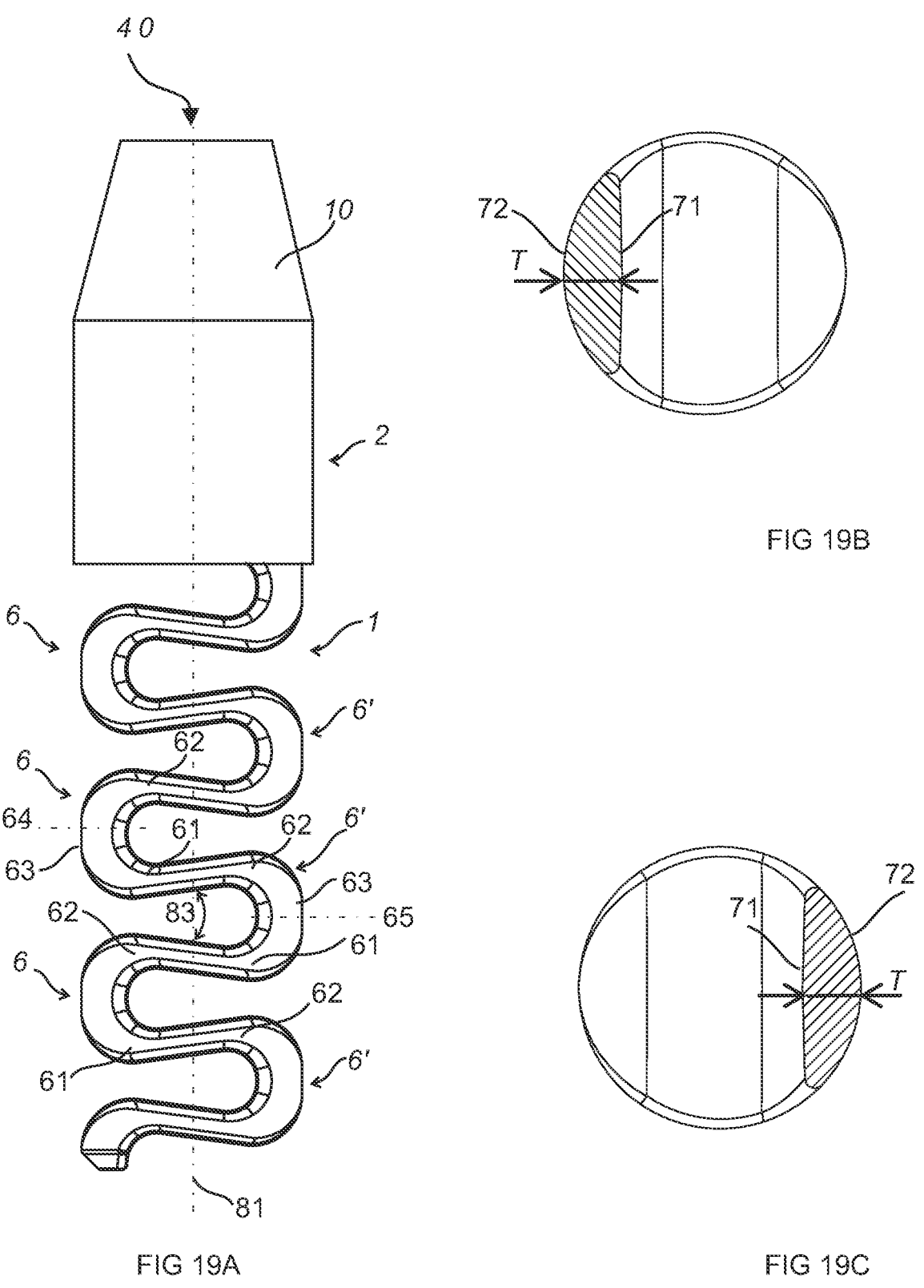
FIG. 19A shows a side view of an embodiment of the locking device.
FIGS. 19B-19C show crosscut views of the embodiment shown in FIG. 19A, and FIG. 20A-20C show a 3D-view and two side views of an embodiment of the locking device.

FIG. 19A shows an embodiment of the locking device which comprises the locking pin 2 and the spring 1 which may comprise a U-shaped portion 6 and an adjacent U-shaped portion 6'. A leg 61 of the U-shaped portion may be connected to a leg 62 of the adjacent U-shaped portion. The leg 61 of the U-shaped portion may converge towards another leg 62 of the U-shaped portion.

The leg 61 of the U-shaped portion 6' may converge towards the another leg 62 of the U-shaped portion 6' at an angle 83 in the range of about 10°-30°, such as 15°-20°.

The U-shaped portion 6 and the adjacent U-shaped portion 6' may be moulded in one piece.

The spring 1 may comprise two or more U-shaped portions 6.

FIG. 19B shows a crosscut 64 at a bottom 63 of the U-shaped portions 6. The crosscut 64 may be non-circular and may comprise an outer surface 72 which may be of a rounded shape and an opposite inner surface 71 which may be essentially straight.

FIG. 19C shows a crosscut 65 at a bottom 63 of the adjacent U-shaped portions 6'. The crosscut 65 may be non-circular and may comprise an outer surface 72 which may be of a rounded shape and an opposite inner surface 71 which may be essentially straight.

The locking device 40 may be configured to be arranged in a panel recess 21 in panel 3.

The outer surface 72 of the crosscut 64 at the bottom 63 of the U-shaped portions 6 and/or the crosscut 65 at the bottom 63 of the adjacent U-shaped portions 6' may be configured to partly match a shape of an inner surface of the panel recess 21.

A partly matching shape of the outer surface 72 and the inner surface of the panel recess 21 may have the advantage that the guiding of the locking device in the panel recess 21 is improved.

The matching shape may have the advantage that the guiding of the spring in the panel recess 21 is improved and may prevent that the spring 1 is pinched in the panel recess 21 during compression and/or when the spring 1 springs back towards a non-compressed state.

The crosscut 64 at the bottom 63 of the U-shaped portions 6 and/or the crosscut 65 at the bottom 63 of the adjacent U-shaped portions 6' may be shaped essentially as a circular segment which may comprise rounded corners.

FIG. 20A shows a 3D-view and FIG. 20*b*-20C shows two side views of an embodiment of the locking device.

The locking device 40 device comprises the locking pin 2 and the spring 1 which may comprise a U-shaped portion 6 and an adjacent U-shaped portion 6'. A leg of the U-shaped portion may be connected to a leg of the adjacent U-shaped portion. The leg of the U-shaped portion may converge towards the other leg of the U-shaped portion.

A side of the locking pin 2 and the spring 1 may comprise a cut-out segment 73 which may facilitate a correct positioning of the locking device 40.

An end part 10 of the locking pin 2 may comprise an indicator 74, such as a recess, for indicating a correct rotational position of the locking device.

Further embodiments are described below:

1. A locking device 40 comprising a spring 1, such as a static load spring, and a locking part, such as a locking pin 2 or a locking disc 26, configured for locking two elements 3, 4 to one another, wherein the spring 1 comprises connecting elements 5 and U-shaped portions 6, 6' in a sequence, wherein one of the U-shaped portions 6 connects two of the connecting elements 5 at a first end 7*a*, 7*b* of each of said two connecting elements 5, the two connecting elements 5 converge in a non-compressed state towards each other towards a second end 8*a*, 8*b* of each of the two connecting elements 5, such that the sequence of connecting elements 5 and U-shaped portions 6, 6' form a meandering shape.

2. A locking device 40 comprising a spring 1 and a locking part, such as locking pin 2 or a locking disc 26, for locking two elements 3, 4 to one another, wherein the spring 1 comprises a U-shaped portion 6 and an adjacent U-shaped portion 6, wherein a leg 61 of the U-shaped portion 6 is connected to a leg 62 of the adjacent U-shaped portion 6.

3. The locking device 40 according to embodiment 2, wherein the spring 1 comprises a connecting element 5 which connects the leg 61 of the U-shaped portion to the leg 62 of the adjacent U-shaped portion 6.

4. The locking device 40 according to embodiment 2 or 3, wherein the leg 61 of the U-shaped portion 6 converges towards another leg 62 of the U-shaped portion 6.

5. The locking device 40 according to any of the preceding embodiments, wherein the spring 1 is configured such that two adjacent U-shaped portions 6 are closer to or contact each other in a compressed state compared to the non-compressed state.

6. The locking device 40 according to any of the preceding embodiments, wherein the spring 1 is configured such that in a compressed state, two adjacent connecting elements 5 are closer to or contact each other at their respective second ends 8*a*, 8*b* compared to the non-compressed state.

7. The locking device 40 according to any of the preceding embodiments, wherein the U-shaped portions 6 are circle segments extending over more than 180°.

8. The locking device 40 according to any of the preceding embodiments, wherein a length L of the connecting element 5 is smaller than a width W of the connecting element 5 at their centre portion.

9. The locking device 40 according to any of the preceding embodiments, wherein one end of the spring 1 ends in the U-shaped portion such that the end 9 points in a direction away from the spring 1.

10. The locking device 40 according to any of the preceding embodiments, wherein the thickness t of the connecting element 5 is smaller than the thickness T of the U-shaped portion 6.

11. The locking device 40 according to any of the preceding embodiments, wherein a shape along the spring is such that a surface circumventing the outer parts of the connecting elements 5 and the U-shaped portions 6 is cylindrical.

12. The locking device 40 according to embodiment 11, wherein a diameter of the cylindrical surface at non-compressed state is greater than at maximum compression of the locking device.

13. The locking device 40 according to any of the preceding embodiments, wherein one end of the locking device 40 comprises the locking pin 2.

14. The locking device 40 according to embodiment 13, wherein the locking pin 2 comprises an end part 10 in the shape of a truncated cone.

15. The locking device 40 according to embodiment 13 or 14, wherein the locking pin 2 comprises a radial recess 11 which optionally extends through the locking pin 2.

16. The locking device 40 according to embodiment 15, wherein the opening of the radial recess 11 is larger on one side of the locking pin 2 such that there is an inner sloping surface 12 towards the other opening.

17. The locking device 40 according to any of the embodiments 13 to 16, wherein the end part 10 comprises a cut-out segment 15.

18. The locking device 40 according to any of the embodiments 13 to 17, wherein a centre portion of the connecting element 5 farthest from the locking pin 2, has two opposed radially projecting parts 14 on its outermost surface.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one".

The invention claimed is:

1. A locking device comprising a spring and a locking part, for locking two elements to one another, wherein the spring comprises a U-shaped portion and an adjacent U-shaped portion disposed along a main longitudinal axis of the locking device, each U-shaped portion comprising a pair of opposing legs extending in a direction transverse to the longitudinal axis and a bottom extending therebetween, wherein one of the opposing legs of the U-shaped portion is connected to one of the opposing legs of the adjacent U-shaped portion, wherein a first crosscut at the bottom of the U-shaped portion comprises an outer surface which is of a rounded shape and an opposite inner surface which is essentially straight, and wherein a second crosscut at the bottom of the adjacent U-shaped portion comprises an outer surface which is of a rounded shape and an opposite inner surface which is essentially straight, the first and second crosscuts being perpendicular to the main longitudinal axis of the locking device.

2. The locking device according to claim 1, wherein the spring comprises a connecting element which connects the one of the opposing legs of the U-shaped portion to the one of the opposing legs of the adjacent U shaped portion.

3. The locking device according to claim 2, wherein the spring is configured such that in a compressed state, the connecting element is closer to or contacts another connecting element at their respective second ends compared to a non-compressed state.

4. The locking device according to claim 2, wherein a length of the connecting element is smaller than a width of the connecting element at its centre portion.

5. The locking device according to claim 2, wherein the thickness of the connecting element is smaller than the thickness of the U-shaped portion.

6. The locking device according to claim 2, wherein a shape along the spring is such that a surface circumventing an outer part of the connecting element and the U-shaped portion is cylindrical.

7. The locking device according to claim 6, wherein a diameter of the cylindrical surface at a non-compressed state is greater than at maximum compression of the locking device.

8. The locking device according to claim 1, wherein the one of the opposing legs of the U-shaped portion converges towards the other one of the opposing legs of the U-shaped portion.

9. The locking device according to claim 1, wherein the spring is configured such that the U-shaped portion and the adjacent U-shaped portion are closer to or contact each other in a compressed state compared to a non-compressed state.

10. The locking device according to claim 1, wherein the U-shaped portion is a circle segment extending over more than 180°.

11. The locking device according to claim 1, wherein one end of the spring ends in the U-shaped portion such that the end points in a direction away from the spring.

12. The locking device according to claim 1, wherein an end of the locking device comprises a locking pin.

13. The locking device according to claim 12, wherein the locking pin comprises an end part in the shape of a truncated cone.

14. The locking device according to claim 12, wherein the locking pin comprises a radial recess which extends at least partially through the locking pin.

15. The locking device according to claim 14, wherein an opening of the radial recess is larger on one side of the locking pin such that there is an inner sloping surface towards an opposing end opening of the radial recess.

16. The locking device according to claim 12, wherein the end part comprises a cut-out segment.

17. The locking device according to claim 12,
    wherein a centre portion of a connecting element farthest from the locking pin has two opposed radially projecting parts on its outermost surface.

18. The locking device according to claim 1, wherein the first crosscut at the bottom of the U-shaped portion and/or the second crosscut at the bottom of the adjacent U-shaped portion is shaped essentially as a circular segment.

19. The locking device according to claim 18, wherein the circular segment comprises rounded corners.

20. The locking device according to claim 1, wherein the spring has a length in a range of about 10-40 mm, and is configured such that an outer diameter of the spring does not increase, or increases by less than 0.3 mm, when the spring is compressed.

21. The locking device according to claim 1, wherein the U-shaped portion is an arcuate segment extending over more than 180°.

* * * * *